US008910553B2

(12) United States Patent
Catelli

(10) Patent No.: US 8,910,553 B2
(45) Date of Patent: Dec. 16, 2014

(54) MACHINE FOR CUTTING PAPER LOGS

(75) Inventor: Paolo Catelli, Lucca (IT)

(73) Assignee: Futura S.p.A., Capannori (LU) Fraz. Guamo (IT)

( * ) Notice: Subject to any disclaimer, the term of this patent is extended or adjusted under 35 U.S.C. 154(b) by 832 days.

(21) Appl. No.: 12/374,592

(22) PCT Filed: Oct. 3, 2007

(86) PCT No.: PCT/IT2007/000693
§ 371 (c)(1), (2), (4) Date: Jan. 21, 2009

(87) PCT Pub. No.: WO2008/062488
PCT Pub. Date: May 29, 2008

(65) Prior Publication Data

US 2009/0314147 A1 Dec. 24, 2009

(30) Foreign Application Priority Data

Nov. 24, 2006 (IT) ................................ FI2006A0292

(51) Int. Cl.
*B26D 7/06* (2006.01)
*B23D 55/04* (2006.01)

(52) U.S. Cl.
USPC ................................ 83/418; 83/788; 83/820

(58) Field of Classification Search
USPC ......... 83/422, 375, 788, 174.1, 418, 421, 820
See application file for complete search history.

(56) References Cited

U.S. PATENT DOCUMENTS

| | | | | | |
|---|---|---|---|---|---|
| 475,328 | A | * | 5/1892 | Long | 83/805 |
| 524,135 | A | * | 8/1894 | Edgar | 83/156 |
| 972,562 | A | * | 10/1910 | Moore | 83/406.1 |
| 2,676,626 | A | * | 4/1954 | Rumsey | 83/709 |
| 2,832,379 | A | * | 4/1958 | Piercey | 83/709 |
| 3,036,485 | A | * | 5/1962 | Pottmann | 83/248 |
| 3,119,419 | A | * | 1/1964 | Fisk et al. | 83/102 |
| 3,231,433 | A | * | 1/1966 | Campbell et al. | 148/211 |
| 3,234,836 | A | * | 2/1966 | Buff | 83/422 |
| 3,718,061 | A | * | 2/1973 | Wilkin | 83/155 |
| 3,797,353 | A | * | 3/1974 | Calhan | 83/718 |
| 3,879,874 | A | * | 4/1975 | Broussard, Sr. | 40/768 |
| 3,889,564 | A | * | 6/1975 | Aspinwall et al. | 83/174 |

(Continued)

FOREIGN PATENT DOCUMENTS

| | | |
|---|---|---|
| EP | 0 391 865 | 10/1990 |
| EP | 1 040 895 A2 | 10/2000 |
| JP | 10 058382 | 3/1998 |

*Primary Examiner* — Sean Michalski
(74) *Attorney, Agent, or Firm* — McGlew and Tuttle, P.C.

(57) ABSTRACT

Machine for cutting paper logs, comprising means for supporting one or more logs (3) disposed side by side, means for advancing the logs (3) on said support means, means for the transverse cutting of the logs (3) and means for blocking logs (3) during their cutting. The said cutting means comprise an annular band blade (4) having a bevel (400, 401) on both its edges, provided in correspondence to a cutting station (T) in which the logs (3) are cut and connected to corresponding guiding and actuating means, the said blade (4) featuring a portion (40) defining a corresponding cutting plane which is oriented orthogonally with respect to the longitudinal axes of logs (3), the said blade being provided with a sharpening device (100) continuously acting on both its bevels (400,401). The machine comprises means for the relative motion of logs (3) with respect to said blade (4) along the said cutting plane. The blade (4) acts on one log (3) at a time.

18 Claims, 9 Drawing Sheets

(56) References Cited

U.S. PATENT DOCUMENTS

| | | | | |
|---|---|---|---|---|
| 3,905,260 A * | 9/1975 | Nystrand | ........................ | 83/155 |
| 4,566,428 A * | 1/1986 | Roujon | ........................... | 125/21 |
| 4,579,025 A * | 4/1986 | Fasolak | ............................. | 82/83 |
| 5,038,647 A * | 8/1991 | Biagiotti | ...................... | 83/155.1 |
| 5,213,022 A * | 5/1993 | Elgan | .............................. | 83/797 |
| 5,761,977 A * | 6/1998 | Jakobi et al. | ...................... | 83/13 |
| 6,532,850 B1 * | 3/2003 | Bergvall et al. | ................... | 83/44 |
| 6,612,920 B1 * | 9/2003 | Young | ........................... | 452/171 |
| 6,722,248 B1 * | 4/2004 | Johnston, Sr. | .................. | 83/795 |
| 6,895,843 B1 * | 5/2005 | Hurdle, Jr. | ........................ | 83/23 |
| 2006/0124435 A1 * | 6/2006 | Benvenuti et al. | ......... | 198/626.1 |
| 2011/0023677 A1 * | 2/2011 | Rundell et al. | .................. | 83/459 |

* cited by examiner

MACHINE FOR CUTTING PAPER LOGS

The present invention relates to a machine for cutting paper logs.

It is known that logs are paper rolls produced by winding machines, by means of which a paper web is wound around a tubular cardboard core. Each log is then divided into various rolls having inferior lengths and corresponding to the standard commercial formats. The division takes place with a succession of cuttings carried out along a plane which is orthogonal to the longitudinal axis of the logs. Machines called "cutting-off machines" are used for this purpose.

A cutting-off machine for paper logs usually features a structure with a horizontal platform, which is provided with a plurality of feeding channels for the logs to be cut off, means for moving the logs along the respective feeding channels, and cutting means cut the logs as said before. Cyclically, each log is positioned adjacent to the cutting means, then it is submitted to cutting, and finally is moved forward to carry out the subsequent cutting.

JP-10058382 describes a cutting-off machine for paper logs in which the cutting means consist of a double bevel annular blade positioned horizontally and vertically moved during the cutting of the logs. More precisely, the blade is band-shaped and features a bevel both on its upper and lower sides, and it is wound on two vertical-axis pulleys, so that each bevel defines a horizontal ring. The logs are positioned on a conveyor provided with two overlapped planes which are oriented orthogonally to the blade. The pulleys on which the blade is wound are supported by a structure which is connected to respective lowering and lifting means. The logs are cyclically disposed in the cutting position, the blade is lowered, then the logs are pushed forward again and the blade is lifted. The logs are cut during the lowering and lifting movements of the blade. FIGS. 1A and 1B show two cutting steps: FIG. 1A shows the blade (B) wound on pulleys (P) during the lowering and cutting of the logs (L); FIG. 1B shows blade (B) which, during the lifting phase, cuts the logs (L) disposed again in the cutting position.

A drawback is due to the fact that the same point of the bevel, both the upper and the lower ones, comes into contact with the material of all the logs to be cut, before it is sharpened. The scheme of FIG. 1C shows that positions (P1, P2, . . . Pn), which are occupied by any point of the bevel, are cutting positions on various logs. In other words, as the blade (B) is horizontal, a same point of the bevel which is being used is obliged to pass through a plurality of logs (L) before exiting the cutting area. As a result, the cutting on the logs which are more downstream with respect to direction (D) of winding of blade (B) is carried out by means of a bevel which does not work in optimal conditions because it becomes less and less sharp while passing through a plurality of logs. Yet in other words, as the blade is horizontally oriented, the cutting of the logs which are downstream with respect to said direction (D) is carried out by means of a rather worn bevel. The quality of the cutting is consequently reduced.

A further inconvenience is due to the fact that the front portions of the logs (L), that is to say the portions (R) which constitute the commercial format rolls, are free. Then, said portions (R) of logs (L) tend to move during cutting on due to the thrust exerted on them by the blade (B) its lowering and lifting. This worsens the quality of the cutting, too.

The main aim of the present invention is to eliminate or at least to remarkably reduce the inconveniences mentioned above.

These results have been achieved, according to the present invention, by providing a machine having the features described in claim 1. Further features of the present invention are the subject of the dependent claims.

Thanks to the present invention, it is possible to divide the paper logs into commercial format rolls by carrying out a neater cutting, that is to say a more definite and precise cutting by using a blade whose bevels work moment by moment on a single log and always feature an active and perfectly sharpening. Moreover, a machine according to the present invention is relatively easy to build, economical and reliable, even after long operating periods, and it allows the blocking of the logs being cut with the utmost efficiency and simplicity.

These and further advantages and characteristics of the present invention will be best understood by anyone skilled in the art from a reading of the following description in conjunction with the attached drawings, given as a practical exemplification of the invention, but not to be considered in a limitative sense, wherein.

Figure 4:
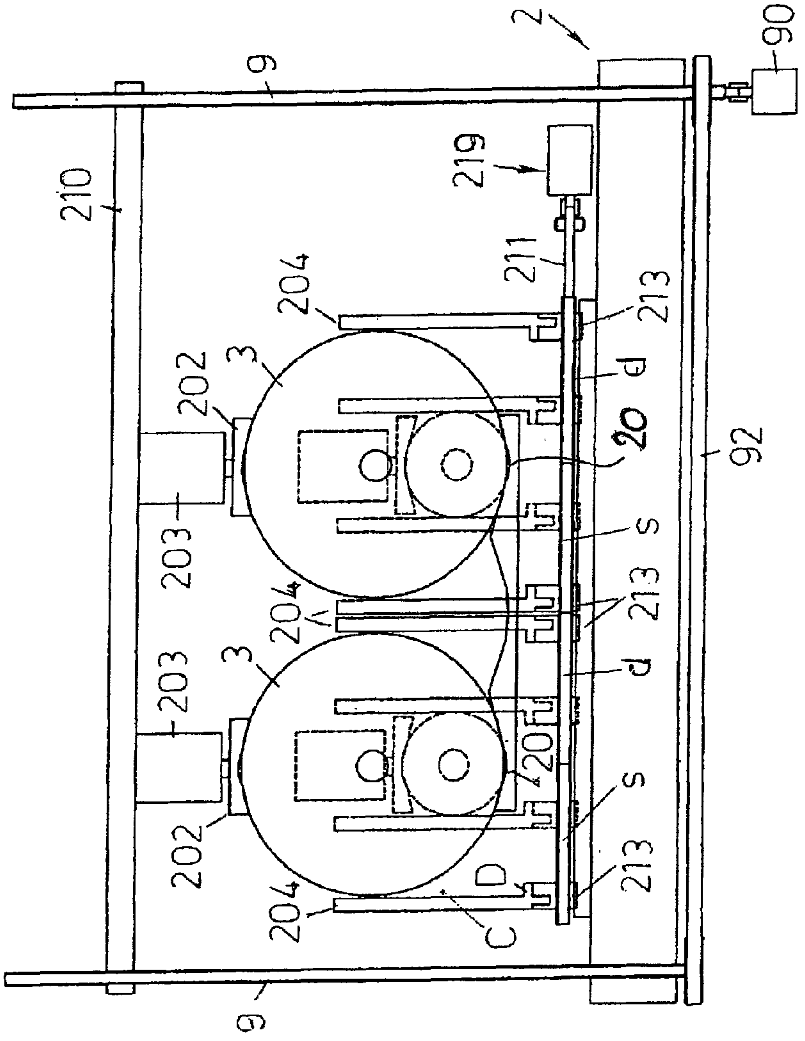
Figure 5:
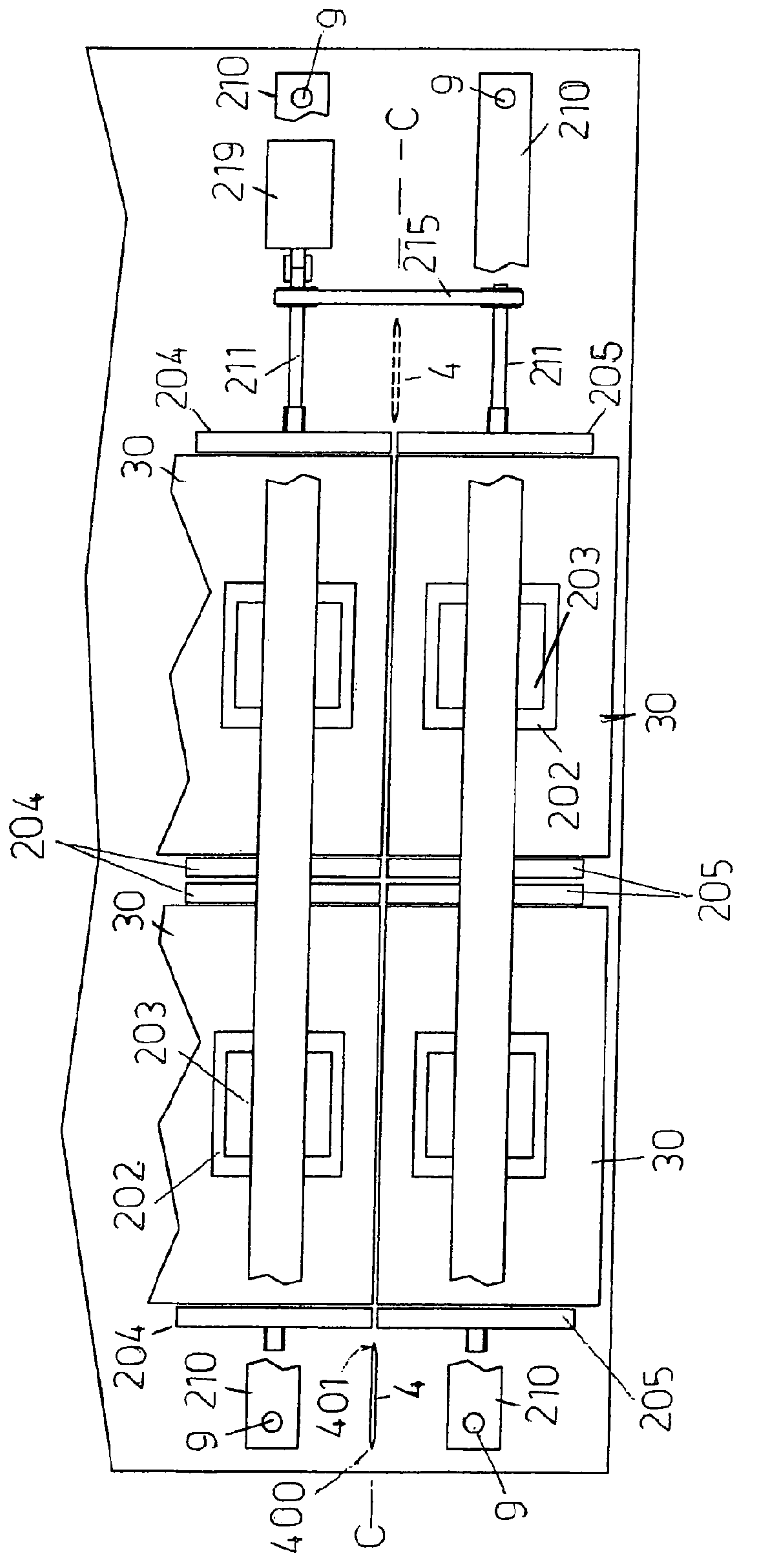
Figure 6:
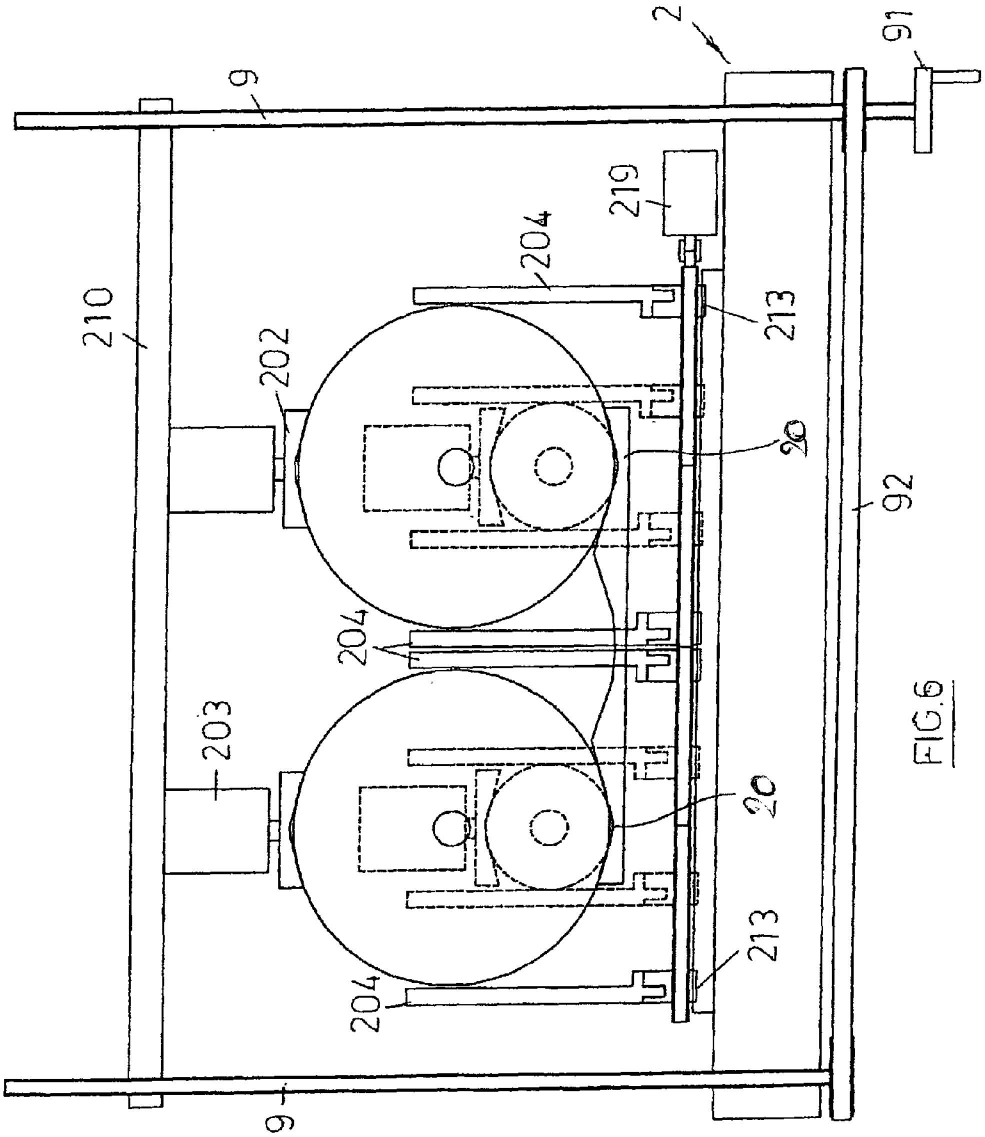
Figure 7:
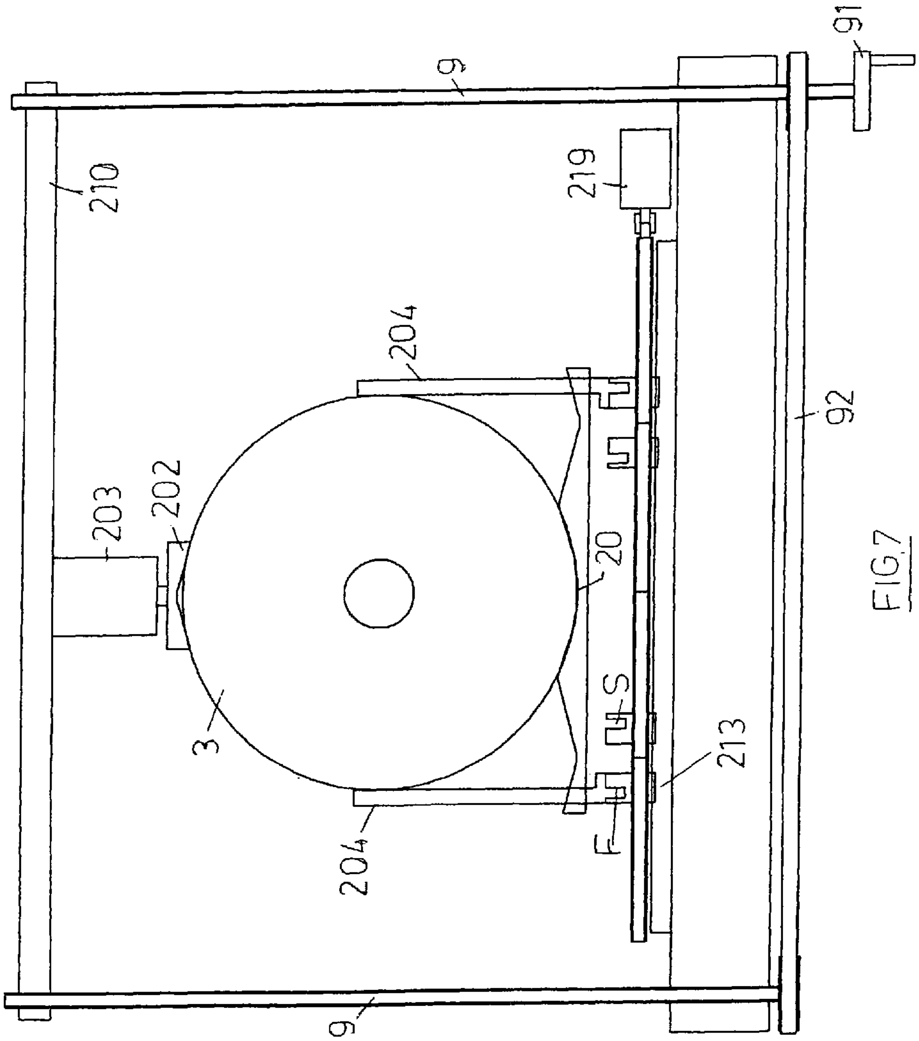
Figure 8:
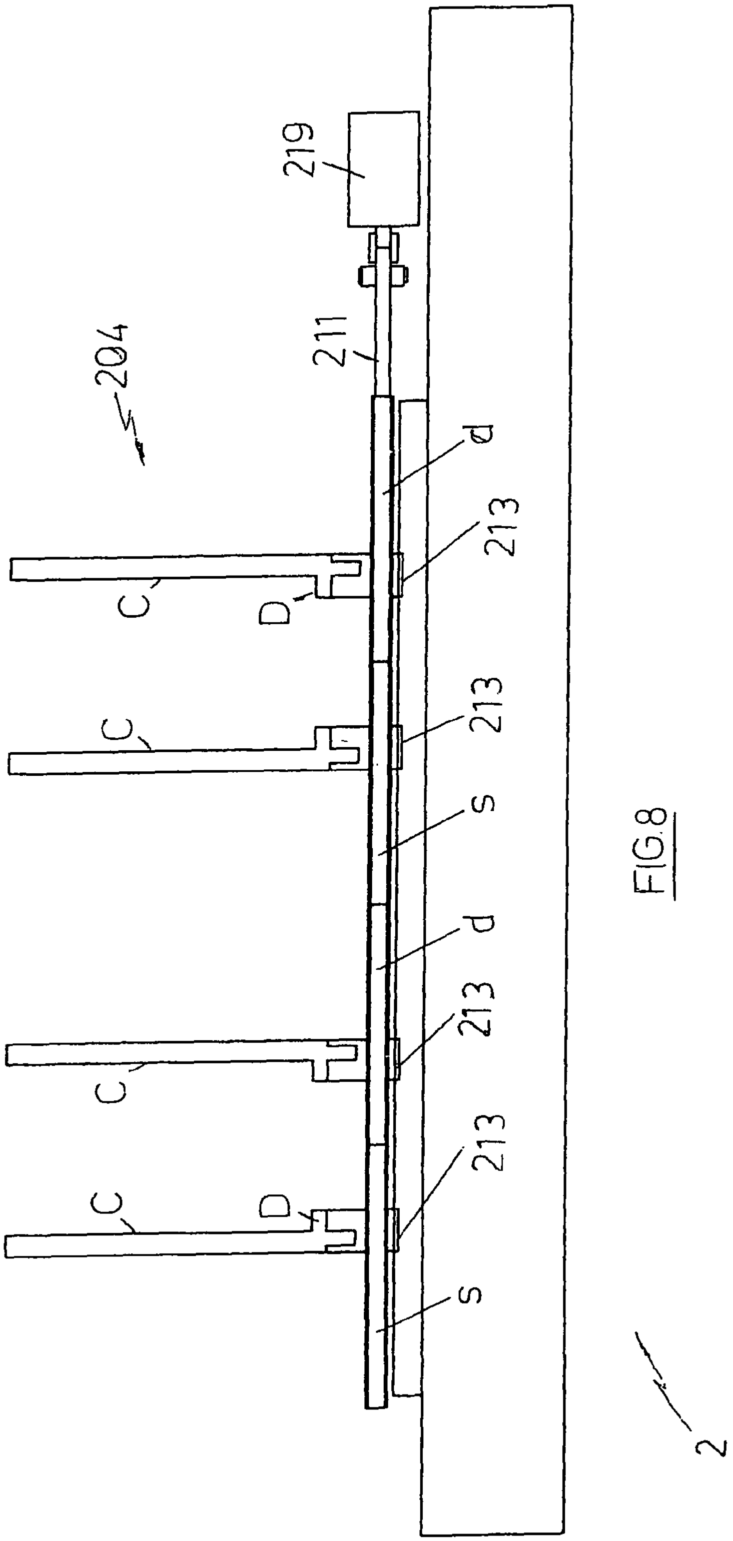
Figure 9:
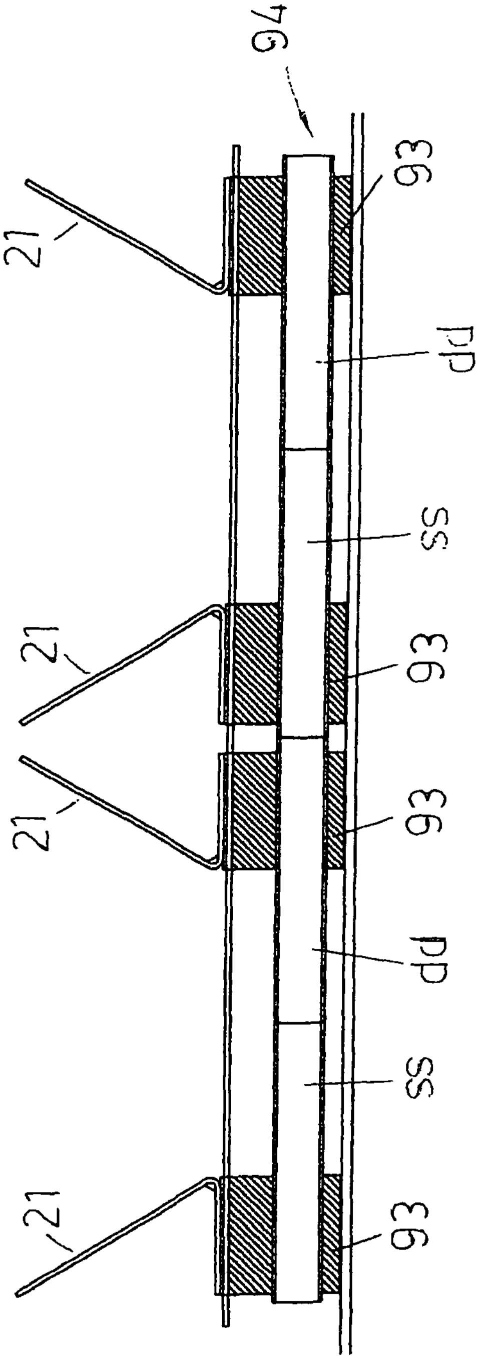

FIG. 4 shoes a schematic front view of the pressers used for blocking the front portions of the logs being cut, in which the parts represented with discontinuous lines show the positions assumed by the pressers when logs with inferior diameters are being worked;

FIG. 5 shows a schematic plan view of the unit shown in FIG. 4, in which the blade (4) is shown both on the right and on the left of the logs;

FIG. 6 shows the same unit of FIG. 4 in which the superstructure lifting/lowering mechanism (200) is manually operated instead of being motorized;

FIG. 7 is similar to FIG. 6, but it shows a single log having a greater diameter;

FIG. 8 shows a detail of the lateral pressers handling mechanism;

FIG. 9 shows a detail of the holding surfaces (21) handling mechanism.

A cutting-off machine for paper logs according to the present invention comprises a base structure (1) provided with a platform (2) onto which one or more paper logs (3) can be horizontally and side by side positioned along respective sliding channels.

In the example shown in the drawings, said channels are delimited, inferiorly and frontally, by corresponding concave surfaces (20) of the platform (2) and are delimited, laterally and on the back, by surfaces (21) whose position on the platform (2) is adjusted in relation to the diameters of the logs (3).

Moreover, the present cutting-off machine comprises cutting means for cutting the logs (3), with a band blade (4) which is ring-wound on two horizontal-axis handwheels, so that the ring defined by the blade (4) is vertical. In other words, the portions (40,41) of the blade (4) resulting between the two handwheels (5) are oriented perpendicularly to the longitudinal axes of the logs (3) disposed on the platform (2). Said cutting means are disposed in correspondence of a cutting station (T) at one end of the structure (1).

Moreover, the cutting-off machine comprises means for advancing the logs (3) along the respective channels of the platform (2).

In the example shown in the drawings, the said means for advancing the logs (3) comprise pushers (22) which are made by parallel extensions, of identical lengths, jutting out forward from a portal (23). The latter is mounted on a carriage (24) which slides along the platform (2) and is fixed on motorized annular belts (25) provided at the sides of the platform (2). The portal (23) is behind the channels along which the logs (3) slide, that is to say, it is on the end opposite to station (T) in which the blade (4) acts. The pushers (22) are oriented like, i.e. parallel to, the longitudinal axes of logs (3) and are at a predetermined height with respect to platform (2).

Figure 3:
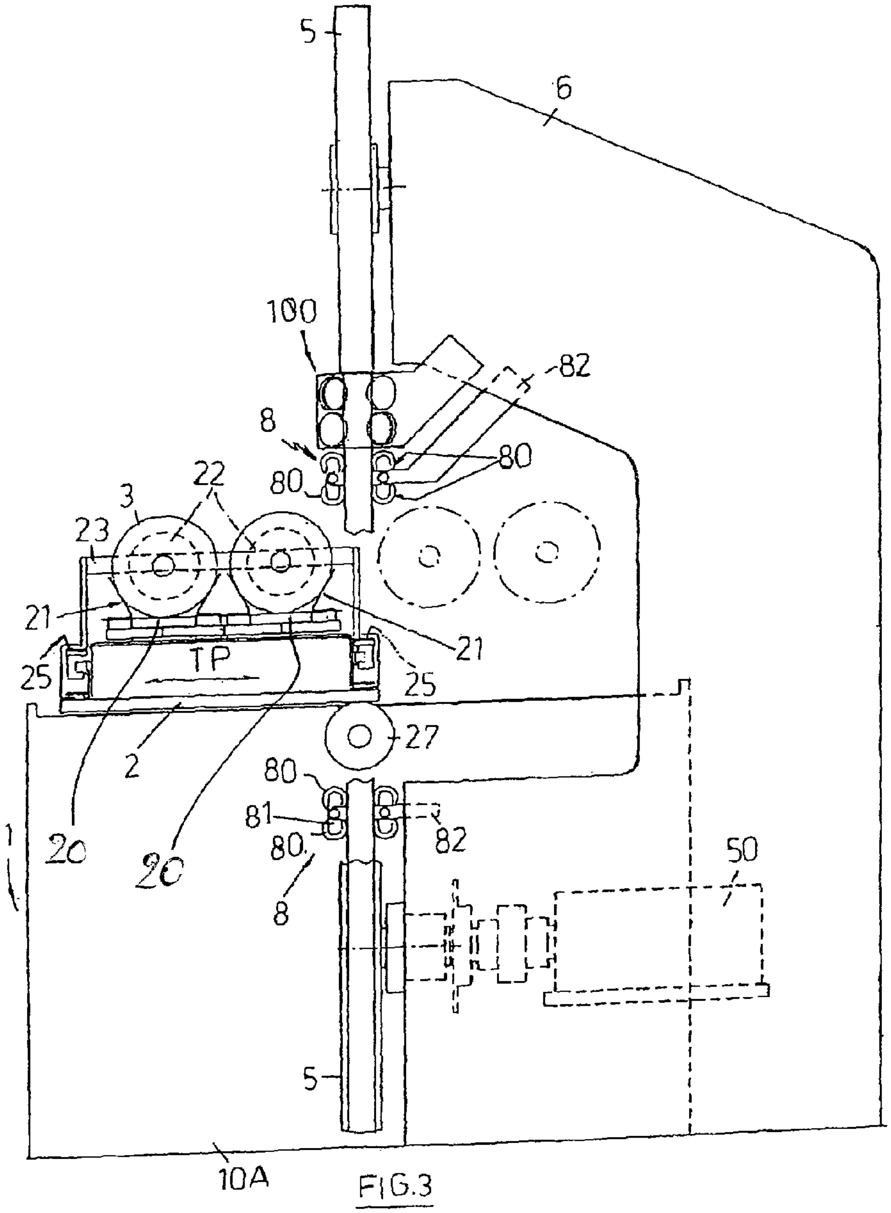
FIG. 3 shows a schematic front view of the cutting-off machine of FIG. 2, wherein some parts are omitted to better show other parts.

The platform (2) is mounted on the structure (1) so that it can move horizontally and transversely to the longitudinal axes of logs (3), as indicated by the double arrow "TP" in FIG. 3.

In the example shown in the drawings, said movement (TP) is obtained by means of an electric motor (29) which rotates an axis (26) provided under the platform (2). This axis is oriented orthogonally to the two heads (10A,10P) of the structure (1), i.e. it is parallel to the channels on which the logs (3) advance. A toothed wheel (27), meshing with a corresponding rack (28) presented by the platform (2), is mounted on said axis (26) both in correspondence to the back head (10A) and to the front head (10A) of the structure (1). In practice, the clockwise and anticlockwise rotation of the axis (26) correspondingly determines the horizontal translation of the platform (2) as indicated by the double arrow "TP".

The said cutting means are provided in correspondence to the front head (10A) of structure (1) and, as previously said, they comprise a band blade (4) which is ring-wound on two handwheels (5). The axes of the two handwheels are horizontal and orthogonal to the advancing direction of logs (3), so that the band (4) always features two portions (40,41), between the handwheels (5), which are oriented orthogonally to the longitudinal axes of the logs.

Figure 1B:
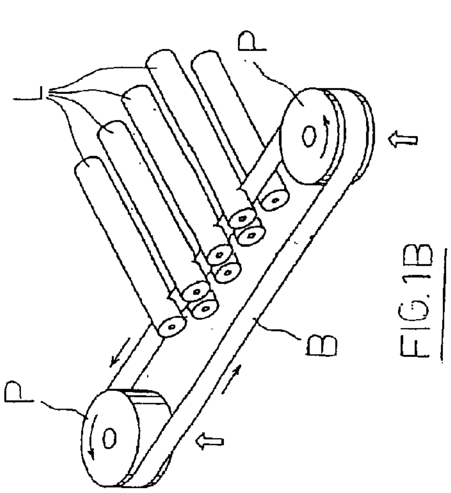
FIGS. 1A-1C are schemes showing how works a known cutting-off machine having a double bevel band blade.
Figure 1A:
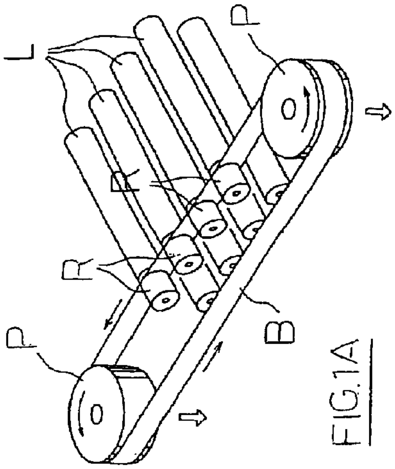
Figure 1C:
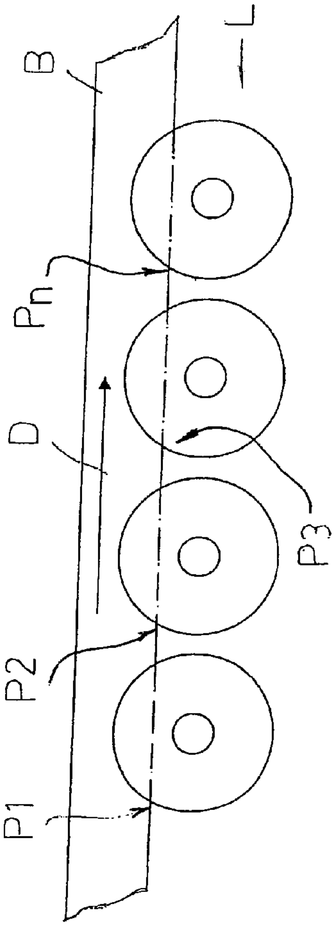
Figure 2:
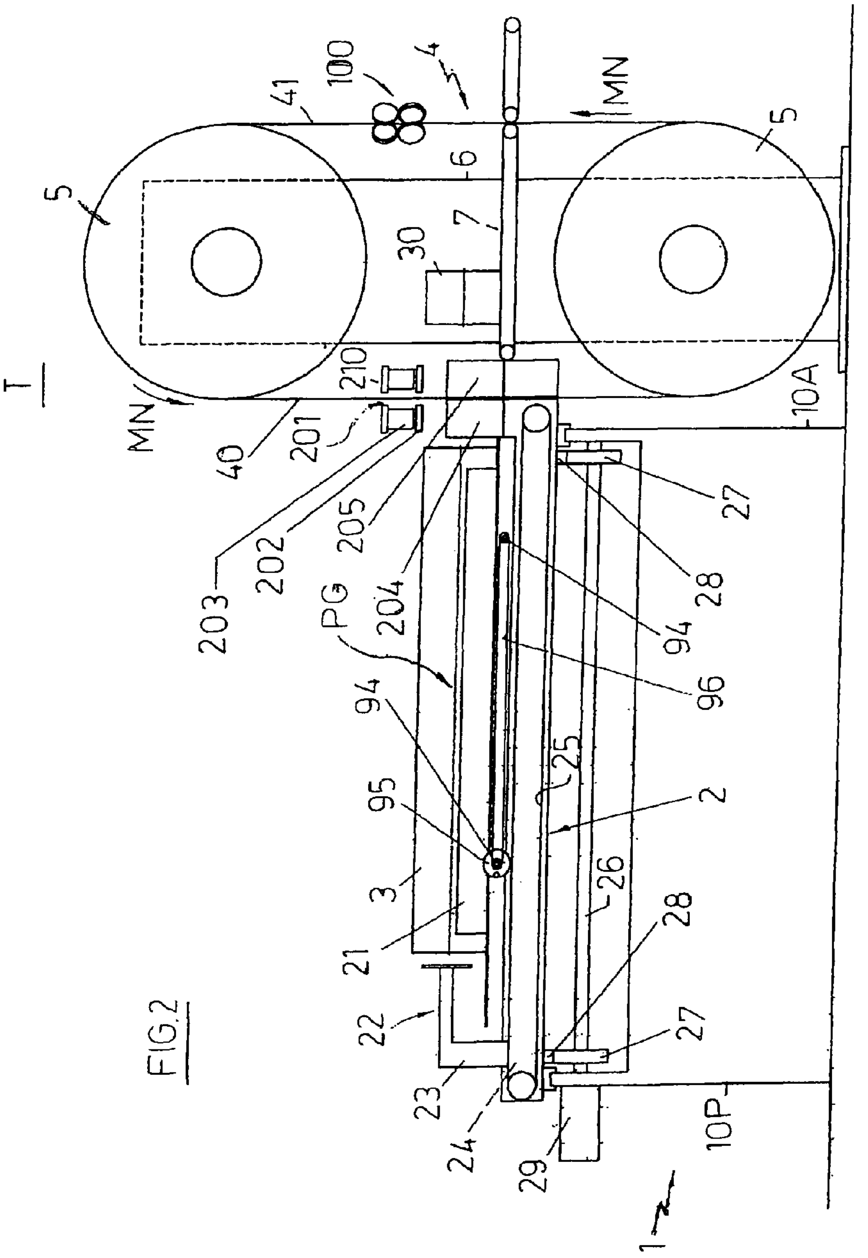
FIG. 2 shows a schematic side view of a cutting-off machine according to the present invention.

Said handwheels (5) are supported by a structure (6) positioned in correspondence to the front head (10A) of base (1) and are connected with an electric motor (50) positioned inside the structure (6) itself, which determines the movement of the band (4) as indicated by arrows "MN" in FIG. 2. Said handwheels (5) are positioned above and under the plane on which the logs (3) slide. Then, the cutting ring defined by the blade (4) extends above and underneath said plane.

The platform (2) features, in correspondence to the cutting station (T), a super-structure provided with two transverse bars (210) between which there is an opening (201) whose length is at least equal to the transverse run (TP) of the platform (2) added up to the width of the band blade (4).

The handwheels (5) are positioned on the structure (6) so that a vertical portion (40) of the blade (4) passes through said opening (201).

In practice, said opening (201) develops orthogonally to the direction along which the logs (3) advance, i.e. it develops along the action plane (C-C) of the blade (4), the action plane of the blade being the plane along which the blade acts on the logs.

A plurality of pairs of pressers (202) are mounted on the lower face of said bars (210) and said pressers are connected to corresponding vertical-axis actuators (203) which, as described below, contribute to holding the logs during the cutting step. The number of pairs of pressers (202) corresponds to the number of the channels on which the logs (3) advance, with a pair of pressers for each of said channels. Each pair of pressers (202) is made by two elements featuring a concave surface whose concavity is turned downwards, which are positioned on opposite sides with respect to the said opening (201), i.e. on opposite sides with respect to the action plane of blade (4). In practice, for each of the above mentioned channels, in correspondence to the station (T) a pair of pressers (202) consisting of two concave elements, one of which is positioned upstream and the other downstream of the action plane (C-C) of blade (4), is provided.

Said bars are (210) mounted on vertical threaded rods (9) which pass through corresponding female threaded holes provided at the ends of the same bars (210). By rotating the rods (9) in the clockwise and anticlockwise direction it is possible to lift or to lower the bars (210). Said rotation can be obtained, for example, by means of a rotary actuator (90) as shown in FIG. 4. As an alternative, the rods (9) can be rotated by means of a handwheel (91) which is mounted on one of the rods underneath the platform (2) as shown in FIGS. 6 and 7. The rods can be connected to one another by means of a transmission with a belt (92) wound around respective pulleys so that a single motorized or manually operated actuator can be used to obtain their rotation. In this way, it is possible to adjust the height of the bars (210) and, consequently, of the pressers (202), according to the diameter of the logs (3).

In correspondence to the station (T), the platform (2) features two pairs of side pressers (204, 205) for each of the channels along which the logs (3) advance, which are positioned respectively upstream and downstream of the action plane of blade (4). More particularly, a pair of lateral pressers (204), provided for each of the aforementioned channels, is destined to act on two sides of the corresponding log positioned upstream of the action plane (C-C) of the blade (4); and a second pair of lateral pressers (205) is destined to act on two sides of the same log downstream of said action plane. As further disclosed below, the side pressers (204, 205) contribute to hold the logs during the cutting step.

All the aforementioned side pressers (204, 205) are connected to a single actuator (219) which controls their closing and respectively opening, that is to say the approach to the logs (3) to hold them during the cutting, and the spacing from the logs away to release the logs and to allow their advancement along the respective channels of platform (2). The actuator (219) rotates two axes (211) which are parallel to each other and oriented orthogonally to the channels (20) of the platform (2), that is to say orthogonally to the axes of the logs (3). The two axes (211) are connected by means of a transmission belt (215), so actuator (219) simultaneously controls the rotation of both.

Each of the said axes (211) features a succession of threaded portions (d,s) each of which meshes with a corresponding female screw provided in a corresponding bushing (213) at the base of pressers (204, 205). As the threads on said portion (d,s) of axes (211) are alternatively clockwise (d) and anticlockwise (s), when axes (211) rotate in the anticlockwise direction, each pair of pressers (204, 205) is moved away from its respective log (3); vice-versa, the anticlockwise direction of axes (211) determines the closing of the side pressers (204, 205), that is to say their approach to the log. In this way, by means of a single actuator, it is possible to carry out the closing and opening of the side pressers (204,205).

Each of the side pressers (204,205) consists of a plate comprising a portion (C) whose surface is destined to be in contact with logs (3) during the cutting step and a base portion (D) destined to be fixed, using screw means (or another removable connecting system), on a respective bushing (213) of the opening/closing mechanism, so as to facilitate their assembly and disassembly. Moreover, each of said side pressers can feature a lower extension (F), in correspondence to the base section (D), which can be restrained in a corresponding seat (S) provided by the bushings (213). The number of pairs of lateral pressers (204, 205) may vary in relation to the diameter and to the number of logs (3) being worked.

More precisely, the side pressers (204, 205) can be mounted on bushings (213) in a variable position and number depending on the diameter and the number of logs being worked, so as to ensure the modularity of the system. As the lateral pressers (204,205) are removably mounted on the bushings (213), their removal and their assembly to re-fit the machine again in case the format of the logs needs to be changed are easy and quick operations.

Similarly, the above mentioned surfaces (21) are movable transversely with respect to the logs (3). For example, as shown in FIG. 2 and in FIG. 9, said surfaces (21) are fixed on bushings (93) with internal female screws engaged by threaded portions (dd, ss) of an axis (94) which is oriented transversely with respect to the surfaces (21). Said threaded portions (dd, ss) alternately feature a clockwise (dd) and an anticlockwise thread (ss), so it is possible to approach them to the logs, and respectively distance them from the logs, by means of a single control, as in the case of the said side pressers (204, 205) In practice, the opening/closing mechanism of surfaces (21) is identical to the opening/closing mechanism of lateral pressers (204,205). FIG. 2 shows a handwheel (95) which acts on two parallel axes (94) by means of a connection belt (96). In practice, the surfaces (21) are mounted on bushings (93) which are longitudinally distanced.

The blade (4) is double bevelled as it features a bevel (400,401) on each edge. A sharpening device (100) is provided, consisting of a plurality of grinding wheels which continuously act on both bevels of the blade, while the latter moves and winds around the handwheels (5), and which are supported by a a supporting arm fixed to the structure (6). Said sharpening device is disposed and acting adjacently to the instantaneously inactive part (41) of the blade (4).

Moreover, advantageously, the structure (6) on which blade (4) is mounted features a guiding device (8) for the blade (4), shown in FIG. 3 only, whose aim is to contribute to the maintenance of the simultaneously vertical position of the instantaneously active portion (40) of the band blade. In this example, said device (8) is duplicated, being one device provided above and one underneath the plane along which the logs (3) advance, that is to say one at an upper height and one at a lower height with respect to the platform (2). According to the example shown in the drawings, the said device (8) consists of a pair of overlapped pulleys, a pair for each right and left side of the blade (4), in whose throats the blade bevels slide. Each of said pulleys (80) features a horizontal axis which is oriented perpendicularly to the portion (40) of the blade and is supported by a corresponding plate (81) which, in turn, is fixed to an arm (82) solid to the structure (6).

Under normal conditions, the cutting-off machine described above works as follows.

In a first step, when lateral pressers (204,205) are open and upper pressers 202 are lifted, the carriage (24) is moved forward. As a consequence, the pushers (22) push on the back side of the logs (3) and cause their forward motion along the respective channels of the platform (2). The logs (3) move forward until they reach a predetermined position, in which the front part of each of them juts beyond the action plane of the blade (4), that is to say it juts beyond the plane of the aforementioned opening (201) for a length corresponding to the length of the commercial format rolls (30) to be obtained. At this point, pressers (202) are lowered and lateral pressers (204, 205) clamp logs (3). In this way, the most advanced portions of logs (3) are laterally blocked by pressers (204, 205) and upperly blocked by pressers (202). Moreover, the logs (3) are held lowerly by the surfaces (20) and on the back by the holding surfaces (21). Then, the platform (2) is translated (for example, leftward) with the blade (4) in operation. The required cutting is consequently carried out on the so positioned and blocked logs (3). During this step, the instantaneously active vertical portion (40) of blade (4) is free to pass through the space provided between the pairs of lateral and upper pressers. During cutting, that is to say during the translation of the platform (2), the logs (3) are submitted to the action of a sharp bevel, as blade (4) is vertical-ring shaped and constantly sharpened. In other words, a bevel never acts on the paper material of two or more logs (3), but on the paper material of one log only, while platform (2) is translating, because the blade (4) winds on the handwheels (5) vertically and annularly. Moreover, as the sharpening device constantly intervenes, each of the two bevels works with the utmost efficiency. In a subsequent step, when the platform (2) is at its end-of-run position, the pressers (202) release the front portions of the logs and the carriage (24) is moved forward again, so as to determine the unloading of the commercial format rolls (30) onto a discharge conveyor (7) disposed downstream and, at the same time, the repositioning of logs (3) in the cutting position. At this point, the pressers (202,204,205) are moved again in the logs-blocking position. Then, the platform (2) is translated in the opposite direction with respect to the previous one (for example, rightward) and a new cutting of the logs takes place. This cycle is repeated for a predetermined number of times.

In practice, the logs (3) are cut at each run of the platform (2). The right bevel (400) of blade (4) acts during the leftward run of the platform (2) and, vice-versa, when platform (2) translates rightward, the left bevel (401) acts.

Seen laterally, blade (4) has the shape of a ring lying on a plane which is perpendicular to the plane defined by the longitudinal axes of the logs. With reference to the scheme of FIG. 2, the plane of the axes of the logs is marked by reference "PG" and exits the sheet, while the plane of the said ring is that of the sheet. During the cutting the logs, due to the relative orientation of said planes, the relative motion between logs (2) and blade (4) causes the portion (40) of said blade to act on one log at a time.

During each cutting step, the blade (4), in particular instantaneously active portion (40), remains perfectly vertical, without remarkably modifying its position, as it is contained in said opening (201) and guided by the guiding device (8).

Practically, all the construction details may vary in any equivalent way as far as the shape, dimensions, elements disposition, nature of the used materials are concerned, without nevertheless departing from the scope of the adopted solution idea and, thereby, remaining within the limits of the protection granted to the present patent.

The invention claimed is:

1. A machine for cutting paper logs, comprising:

a support means for supporting a plurality of paper logs disposed side by side, said support means comprising a platform having a plurality of longitudinal channels onto which the paper logs are horizontally positioned, side by side;

a means for advancing the logs on said support means such that said logs slide along said longitudinal channels;

a means for the transverse cutting of the logs;

a means for blocking logs during cutting of the logs, said means for the transverse cutting of the logs comprising an annular two bevel band blade, said band blade being provided in correspondence to a cutting station for cutting the logs and connected to corresponding guiding and actuating means, said blade having a portion defining a corresponding cutting plane which is oriented orthogonally with respect to said support means, said blade being provided with a sharpening device continuously acting on each bevel; and a means for relative motion of said support means with respect to said blade along said cutting plane, wherein the support means supports the logs such that the longitudinal axes of the logs lie on a same lying plane, the blade acting on one log at a time and said means for relative motion moving said support means bidirectionally with respect to said cutting plane along a direction parallel to said lying plane to execute a first cutting run and said support means executes a second cutting run for cutting the logs after said first cutting run, said first cutting run and said second cutting run being opposite to each other, said platform including a superstructure with two transverse bars between which there is an opening capable of accommodating the blade as the support means is moved through said first cutting run and said second cutting run, and said superstructure further including a plurality of pairs of pressers connected to corresponding vertical-axis actuators, said pairs of pressers being in a number corresponding to that of the logs, with a pair of pressers for each log, each pair of pressers comprising two elements positioned on opposite sides with respect to said opening such that one of said elements is located on a side opposite another element with respect to the action plane of the blade, one of said elements being positioned upstream of said action plane of said blade and another of said elements being located downstream of the action plane of said blade, each pair of pressers being provided for each of the logs in correspondence to the cutting station.

2. A machine according to claim 1, wherein said support means for the logs comprises a horizontal platform which is movable parallel to the cutting plane of said blade.

3. A machine according to claim 2, wherein said platform is moved by means of an electric motor which rotates an axis disposed under the platform and oriented parallel to the logs, on two points of said axis being provided a toothed wheel meshing with a corresponding rack presented by platform.

4. A machine according to claim 1, wherein said means for advancing the logs comprises pushers comprising parallel extensions, of identical lengths, extending forward from a portal, said portal being mounted on a carriage which slides along the platform, said portal being fixed on motorized annular belts provided at the sides of the platform, said portal being behind the channels along which the logs slide such that said portal is on the end opposite to station in which the blade acts, said pushers being oriented parallel to the longitudinal axes of logs and being at a predetermined height with respect to said platform.

5. A machine according to claim 1, wherein said blade extends above and underneath a platform on which the logs are disposed.

6. A machine according to claim 1, wherein said bars, and said pressers, are height-adjustable in relation to said platform.

7. A machine according to claim 1, wherein said means for blocking the logs during cutting of the logs comprises a plurality of side pressers which can be moved from and toward the logs in relation to the diameter of the logs, said side pressers being connected to a single actuator.

8. A machine according to claim 7, wherein said means for blocking the logs during cutting of the logs comprises two pairs of side pressers for each log, which are respectively upstream and downstream of the action plane of the blade, wherein a first pair of side pressers acts on two sides of the corresponding log upstream of the action plane of the blade and a second pair of side pressers acts on two sides of the log downstream of said action plane.

9. A machine according to claim 7, wherein said actuator moves two parallel axes which are oriented orthogonally in relation to the axes of the logs and causes said axes to rotate, said axes being connected by means of a transmission belt such that the actuator simultaneously controls the rotation of said axes, each of said axes having a succession of threaded portions, each of said threaded portions being meshed with a corresponding female screw provided in a corresponding bushing at the base of the side pressers, the threads on said portions of axes being alternately clockwise and anticlockwise.

10. A machine according to claim 9, wherein each of said lateral pressers consists of a plate with a portion having a surface for contacting the logs during cutting of the logs and a base portion for being removably fixed on a respective bushing.

11. A machine according to claim 10, wherein each of said side pressers comprises a lower extension on the base portion which can be fixed into a corresponding seat defined by said bushings.

12. A machine according to claim 7, wherein each of said side pressers comprises a lower extension on the base portion which can be fixed into a corresponding seat defined by said bushings.

13. A machine according to claim 1, wherein said support means for the logs comprises a plurality of side holding surfaces to hold a back side of the logs and a distance defined by said side holding surfaces is adjustable by means of a single actuator.

14. A machine for cutting paper logs, comprising:

a platform receiving a plurality of logs;

a cutting device structure having an annular blade, said cutting device structure being in a stationary position, said annular blade comprising a first cutting edge and a second cutting edge, said first cutting edge being opposite said second cutting edge, said first cutting edge comprising a plurality of first bevels, said second cutting edge comprising a plurality of second bevels, said cutting device structure being fixed relative to said platform;

a sharpening device, said sharpening device engaging said first cutting edge and said second cutting edge such that said sharpening device sharpens each said bevel of said annular band blade;

a moving means for moving said platform in a first direction parallel to said cutting device structure and a second direction parallel to said cutting device structure such said cutting device engages one log at a time as said platform moves in said first direction parallel to said cutting device and said cutting device engages one log at a time as said platform moves in said second direction parallel to said cutting device, said first direction being opposite said second direction, wherein said platform moves relative to said annular blade and said cutting device structure, said platform including a superstructure with two transverse bars between which there is an opening capable of accommodating the blade as the platform is moved in said first and second directions to cut one log at a time, and said superstructure further including a plurality of pairs of pressers connected to corresponding vertical-axis actuators, said pairs of pressers being in a number corresponding to that of the logs, with a pair of pressers for each log, each pair of pressers comprising two elements positioned on opposite sides with respect to said opening such that one of said elements is located on a side opposite another element with respect to the action plane of the blade, one of said elements being positioned upstream of said action plane of said blade and another of said elements being located downstream of the action plane of said blade, each pair of pressers being provided for each of the logs in correspondence to the cutting station.

15. A machine in accordance with claim 14, wherein at least a portion of said cutting device defines a cutting plane, said first direction and said second direction being perpendicular to said cutting plane, wherein said platform comprises a plurality of longitudinal channels, each of said longitudinal channels being adjacent to another one of said longitudinal channels, each of said longitudinal channels receiving a log, wherein each log is adjacent to another log to define a side by side arrangement of logs.

16. A machine for cutting paper logs, comprising:

a platform for receiving a plurality of the paper logs, said platform defining a log receiving plane, wherein said platform comprises a plurality of longitudinal log receiving channels arranged adjacent to each other, each of said plurality of longitudinal log receiving channels receiving at least one of the paper logs;

a plurality of pushers connected to said platform;

a cutting device in a fixed position, each of said pushers being mounted for movement for moving at least one log in a direction of said cutting device, said cutting device being fixed relative to said platform, said cutting device comprising an annular band blade, said annular band blade comprising a first band blade edge and a second band blade edge, said first band blade edge being opposite said second band blade edge, said first band blade edge comprising a plurality of first beveled teeth, said second band blade edge defining a plurality of second beveled teeth, said blade having a portion defining a corresponding cutting plane;

a sharpening device, said sharpening device continuously acting on each of said plurality of first beveled teeth and each of said plurality of second beveled teeth;

a moving means for moving said platform in a first direction parallel to said log receiving channel plane, relative to said cutting device, from a first position to a second position and for moving said platform from said second position to said first position, relative to said cutting device, in a second direction parallel to said log receiving channel plane, wherein said first direction is opposite said second direction, wherein said blade cuts each of the paper logs, wherein said cutting device is in said fixed position as said platform moves in said first direction and said second direction, said platform including a superstructure with two transverse bars between which there is an opening capable of accommodating the blade as the platform is moved in said first and second directions to cut one log at a time, and said superstructure further including a plurality of pairs of pressers connected to corresponding vertical-axis actuators, said pairs of pressers being in a number corresponding to that of the logs, with a pair of pressers for each log, each pair of pressers comprising two elements positioned on opposite sides with respect to said opening such that one of said elements is located on a side opposite another element with respect to the action plane of the blade, one of said elements being positioned upstream of said action plane of said blade and another of said elements being located downstream of the action plane of said blade, each pair of pressers being provided for each of the logs in correspondence to the cutting station.

17. A machine in accordance with claim 16, wherein said log receiving plane is perpendicular to said cutting plane.

18. A machine in accordance with claim 17, wherein said blade engages one log at a time when said platform moves from said first position to said second position via said moving means and said blade engages one log at a time when said platform moves from said second position to said first position via said moving means, wherein a plurality of holders are connected to said platform, each of said pushers engaging one end of a log, each of said holders engaging another end of a log during cutting of the logs.

* * * * *